Feb. 21, 1939.   J. P. BURKE   2,148,104
VIBRATION DAMPENER
Filed April 12, 1937
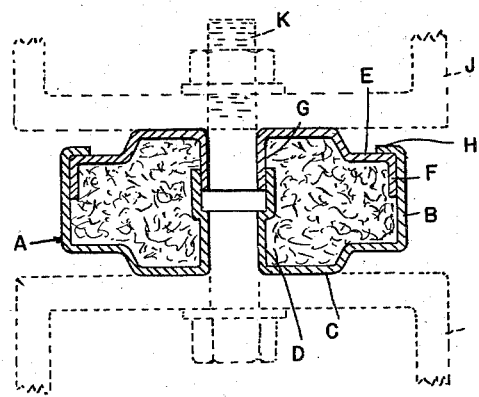
FIG.I.
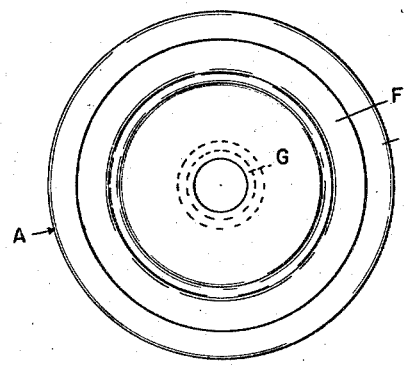
FIG.2.
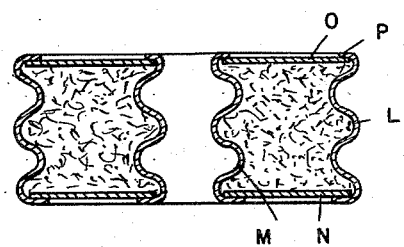
FIG.3.
*INVENTOR*
JAMES P. BURKE
BY
*ATTORNEYS*

Patented Feb. 21, 1939

2,148,104

UNITED STATES PATENT OFFICE 2,148,104

VIBRATION DAMPENER

James P. Burke, Knoxville, Tenn., assignor, by mesne assignments, to Vermiculite Corporation of America, Detroit, Mich., a corporation of Michigan Application April 12, 1937, Serial No. 136,459

1 Claim. (Cl. 248—358)

The invention relates to vibration dampeners and consists in the novel construction as hereinafter set forth.

In the drawing:

Figure 1 is a vertical central section through my improved dampener;

Figure 2 is a plan view thereof;

Figure 3 is a view similar to Figure 1 showing a slightly modified construction.

Generally described, my improved construction of vibration dampener comprises a collapsible casing and a cushion therein formed of exfoliated vermiculite. This material is in the form of irregular flakes having a certain degree of resiliency and in mass having a relatively high percentage of voids. Thus, when such material is combined and subjected to load it will compress and will again expand when the load is released. However, internal friction will retard the return movement and will also absorb a portion of the energy.

As shown in Figure 1, A is a casing preferably formed of pressed sheet metal having the cylindrical outer wall B, a central embossed bottom portion C and a central upwardly extending tubular portion D. E is a cover portion having the center embossed to correspond to the bottom C and having an annular flange F telescopically engaged within the cylindrical flange B. There is also a depending central tubular portion G which telescopically engages the tubular portion D.

With the structure as thus far described, the exfoliated vermiculite is placed within the casing A and the cover portion E is then placed thereon and forced downward under an initial load to place the vermiculite under a certain degree of compression. The flange B is then turned over the cover E, as indicated at H, to form a limiting stop therefor.

The completed structure may be applied to various uses such as indicated in dotted lines in Figure 1 in which I is a base and J a superstructure supported thereon. The vibration dampener is placed between these two members and is secured thereto by a bolt K passing through the central tubular portions D and G. Thus, any load on the member J which is in excess of the initial load placed on the cover E will produce a further compression of the vermiculite, the cover telescoping within the casing. If this load is varied as in the case of shocks or vibrations, the vermiculite will yield in response thereto, but because of internal friction will be slow in recoil. Thus, the device forms an excellent shock absorber and vibration dampener.

In Figure 3 I have shown a modified construction in which I substitute a metallic bellows L for the casing A, and an inner metallic bellows M for the tubular portion D. The space between these bellows is closed by annular bottom and top plates N and O which are retained by turned flanges P at the ends of the bellows. Before placing on the cover O, the space between the bellows is filled with exfoliated vermiculite. With this structure there will be the same action but without any sliding movement of the metallic parts upon each other.

What I claim as my invention:

A vibration dampener comprising a casing having a bottom, a cylindrical outer wall, a tubular inner wall, a cover for said casing having a peripheral portion telescopically engaging said outer wall, a tubular portion telescopically engaging said inner wall, a body of exfoliated vermiculite filling the space between said outer and inner walls and placed under initial compression, and a turned flange on said outer wall forming a stop for the outward movement of said cover and holding said vermiculite under its initial compression.

JAMES P. BURKE.